(12) United States Patent
Hsu et al.

(10) Patent No.: US 8,434,833 B2
(45) Date of Patent: May 7, 2013

(54) MOUNTING ASSEMBLY (75) Inventors: Wan Lin Hsu, Hsinchu (TW); Po Hsuan Peng, Hsinchu (TW)

(73) Assignee: Getac Technology Corporation, Hsinchu (TW)

( * ) Notice: Subject to any disclaimer, the term of this patent is extended or adjusted under 35 U.S.C. 154(b) by 144 days.

(21) Appl. No.: 12/891,693

(22) Filed: Sep. 27, 2010

(65) Prior Publication Data
US 2011/0315841 A1 Dec. 29, 2011

(30) Foreign Application Priority Data

Jun. 24, 2010 (CN) .......................... 2010 1 0217370

(51) Int. Cl.
A47B 97/00 (2006.01)
(52) U.S. Cl.
USPC .................... 312/223.2; 312/311; 361/679.39
(58) Field of Classification Search ................ 312/223.2, 312/223.1, 222, 319.1, 328, 329, 327, 215, 312/311; 361/724–727, 679.02, 679.31, 361/679.32, 679.33, 679.34, 679.35, 679.38, 361/679.39; 292/340, 341.15, 341.18, 341.19, 292/137, 163
See application file for complete search history.

(56) References Cited

U.S. PATENT DOCUMENTS

| 6,301,116 | B1 * | 10/2001 | Tamura | 361/727 |
|---|---|---|---|---|
| 7,173,815 | B2 * | 2/2007 | Lee | 361/679.57 |
| 7,426,116 | B1 * | 9/2008 | Peng | 361/756 |
| 7,679,899 | B2 * | 3/2010 | Hsieh et al. | 361/679.38 |
| 7,929,289 | B2 * | 4/2011 | Tseng | 361/679.39 |
| 8,026,451 | B2 * | 9/2011 | Lai | 174/542 |
| 8,085,530 | B2 * | 12/2011 | Zhang et al. | 361/679.33 |
| 8,189,327 | B2 * | 5/2012 | Chang | 361/679.31 |
| 8,199,480 | B2 * | 6/2012 | Chen et al. | 361/679.31 |
| 2002/0071254 | A1 * | 6/2002 | Tien | 361/727 |
| 2002/0145366 | A1 * | 10/2002 | Yang | 312/223.2 |
| 2005/0128919 | A1 * | 6/2005 | Huang et al. | 369/75.11 |
| 2008/0074018 | A1 * | 3/2008 | Wu et al. | 312/223.2 |
| 2008/0174946 | A1 * | 7/2008 | Chen et al. | 361/683 |
| 2009/0161309 | A1 * | 6/2009 | Yang | 361/679.39 |
| 2010/0165592 | A1 * | 7/2010 | Takao | 361/807 |

FOREIGN PATENT DOCUMENTS

| TW | 547900 | 8/2003 |
|---|---|---|
| TW | 556862 | 10/2003 |

* cited by examiner

Primary Examiner — James O Hansen
Assistant Examiner — Daniel Rohrhoff (57) ABSTRACT A mounting assembly is configured in a case having an opening and a door panel. The door panel is pivoted to the case so as to cover the opening or uncover the opening by removing the door panel. The mounting assembly includes at least one fixing rod, a stopper member, at least one elastic member and an actuator. The fixing rod is disposed on one inner side of the case adjacent to the opening. The stopper member and the elastic member are movably disposed on the fixing rod. The actuator is disposed on the door panel. When the door panel covers the opening, the actuator is incorporated with the stopper member, such that the stopper member shields the opening, so as to avoid an object moving around or away from the case through the opening.

9 Claims, 12 Drawing Sheets

MOUNTING ASSEMBLY

BACKGROUND OF THE INVENTION

1. Field of the Invention

The present invention relates to a mounting assembly, and more particularly to a mounting assembly for preventing an object moving around or away from a case.

2. Related Art

Along with the rapid development of electronic industry, the application range of various electronic devices becomes wider, and the electronic device such as a desktop computer, notebook computer, tablet computer, digital camera and global position system (GPS) has been widely accepted by the customers. Regarding these electronic devices, in order to extend the convenience in use and operating efficiency, removable (or hot plug) peripherals such as a battery pack, hard drive or optical disc drive are generally disposed on the electronic devices, and thus users may assemble or replace different removable peripherals at will according application requirements.

Generally, in design of electronic devices, the case includes a plurality of openings for removing the removable peripherals, such that users can directly assemble and replace the peripherals through the openings without disassembling the case. For example, a floppy drive, hard drive, optical disc drive or battery pack is assembled to or disassembled from the case through the opening, which provides the convenience for users to disassemble and assemble the peripherals. In another aspect, in order to prevent dust or other foreign matters from entering the case through the opening, a shield must be configured at the opening of the case. The shield is, for example, a movable door panel structure, which achieves the effect of covering or uncovering the opening and provides a protection for preventing the removable peripherals moving around or away from the case through the opening.

However, for some electronic devices applied in severe or harsh environments, such as video players applied on vehicles or military-specification portable computers or rugged computers, the movable door panel structure cannot provide proper protection for the removable peripherals disposed in the case. Since the electronic devices are usually subjected to vibration or external impact, the electronic devices must have the properties of drop resistance and impact resistance, and thus meet strict requirements for reliability.

However, regarding the movable door panel structure disposed on the electronic device, generally, after the door panel covers the opening, a spacing exists between the door panel and the removable peripherals, and the spacing provides a course for travel for the removable peripherals in the case when the electronic device is subjected to impact, such that the removable peripherals become loose and slip in the case, resulting in the damages of the removable peripherals and the case due to rubbing against each other. Meanwhile, the removable peripherals are liable to impact the movable door panel structure and fall out of the case through the opening, which causes the damages of the movable door panel structure and the removable peripherals at the same time.

Currently, in order to solve the problem, a hook structure having elastic restoring force is configured at the opening of the case or the shield for securing door panel structure, such that the removable peripherals is locked by the hook structure or blocked by the fixed door panel structure, and thus limited in the case of the electronic device, so as to prevent the removable peripherals moving around or away from the case through the opening. However, for the fixing method using the hook structure, the surface of the removable peripherals may be scratched by the hook structure in the disassembling and assembling process, due to the hook structure continuously presses against the removable peripherals.

Generally, the fixed door panel structure is secured on the case by means of screws or bolts, and the removable peripherals are installed in the case. Therefore, when replacing the removable peripherals, the users must use a certain manual tool to remove the securing members first, in order to successfully remove the fixed door panel structure from the case. Therefore, the operating procedures of replacing the removable peripherals are rather complex and inconvenient. In addition, there is no fixing device to secure the removable peripherals inside the case, so, the removable peripherals may easily move around or away from the case and get damaged due to impact after the fixed door panel structure is removed.

SUMMARY OF THE INVENTION

Accordingly, the present invention is a mounting assembly, which overcomes the problems that the conventional door panel structure for preventing removable peripherals moving around or away from a case cannot effectively secure the removable peripherals inside the case. Besides, the conventional fixing method does not allow fast assembly and disassembly of the removable peripherals in the case by users.

The present invention discloses a mounting assembly, configured in a case having an opening and a door panel. The door panel is pivoted to the case and is capable of rotating relative to the case so as to cover the opening or uncover the opening. The mounting assembly comprises at least one fixing rod, a stopper member, at least one limiting rod, an actuator and at least one first elastic member. The fixing rod is disposed on one inner side of the case adjacent to the opening. The stopper member is movably disposed on the fixing rod, and is capable of reciprocating movement between a first position and a second position on the fixing rod. When the stopper member is at the first position, the stopper member is away from the opening, and when the stopper member is at the second position, the stopper member shields the opening. The limiting rod is disposed on the inner side of the case, and is located on one side of the fixing rod away from the opening. The actuator has at least one groove, is sleeved on the limiting rod through the groove, and is capable of reciprocating movement between an initial position and a release position relative to the limiting rod. When the actuator is at the initial position, the stopper member urges against the actuator and is maintained at the first position, and when the actuator is at the release position, the actuator is detached from the stopper member, such that the stopper member slips to the second position. The first elastic member is disposed in the case. One end of the first elastic member is connected to the case, and the other end of the first elastic member is connected to the actuator, such that the actuator is normally maintained at the initial position.

The present invention discloses another mounting assembly, configured in a case having an opening and a door panel. The door panel is pivoted to the case and is capable of rotating relative to the case so as to cover the opening or uncover the opening. The mounting assembly comprises at least one fixing rod, a stopper member, an elastic member and an actuator. The fixing rod is disposed on one inner side of the case adjacent to the opening. The stopper member is movably disposed on the fixing rod, and is capable of reciprocating movement between a first position and a second position. When the stopper member is at the first position, the stopper member is away from the opening, and when the stopper member is at the second position, the stopper member shields the opening. The elastic member is sleeved on the fixing rod, and one end of the elastic member presses against the stopper member, such that the stopper member is normally at the first position. The actuator is disposed on one side of the door panel opposite to the opening, and is corresponding to the stopper member. When the door panel covers the opening, the actuator presses the stopper member, such that the stopper member compresses the elastic member and moves to the second position.

The efficacy of the present invention lies in that, when a user accommodate an object in the case, the actuator drives the stopper member to move from the first position to the second position, such that the stopper member shields the opening and separates the object and the opening, and the object is stopped by the stopper member and thus limited in the case. Therefore, when the case is subjected to external impact, the object is prevented from becoming loose due to vibration and move away from the case, thereby preventing the object from impacting the door panel to cause damage and falling out of the case.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

A mounting assembly of the present invention is disposed in a case of an electronic device, such as a notebook computer, industrial computer, tablet computer, digital camera or GPS equipped with removable peripherals (such as battery, hard drive or optical disc drive). In the embodiments of the present invention, illustration is given by taking a battery as an example of the removable peripherals and taking a case for accommodating the battery in an electronic device as an example of the case, but the present invention is not limited thereto.

Figure 1:
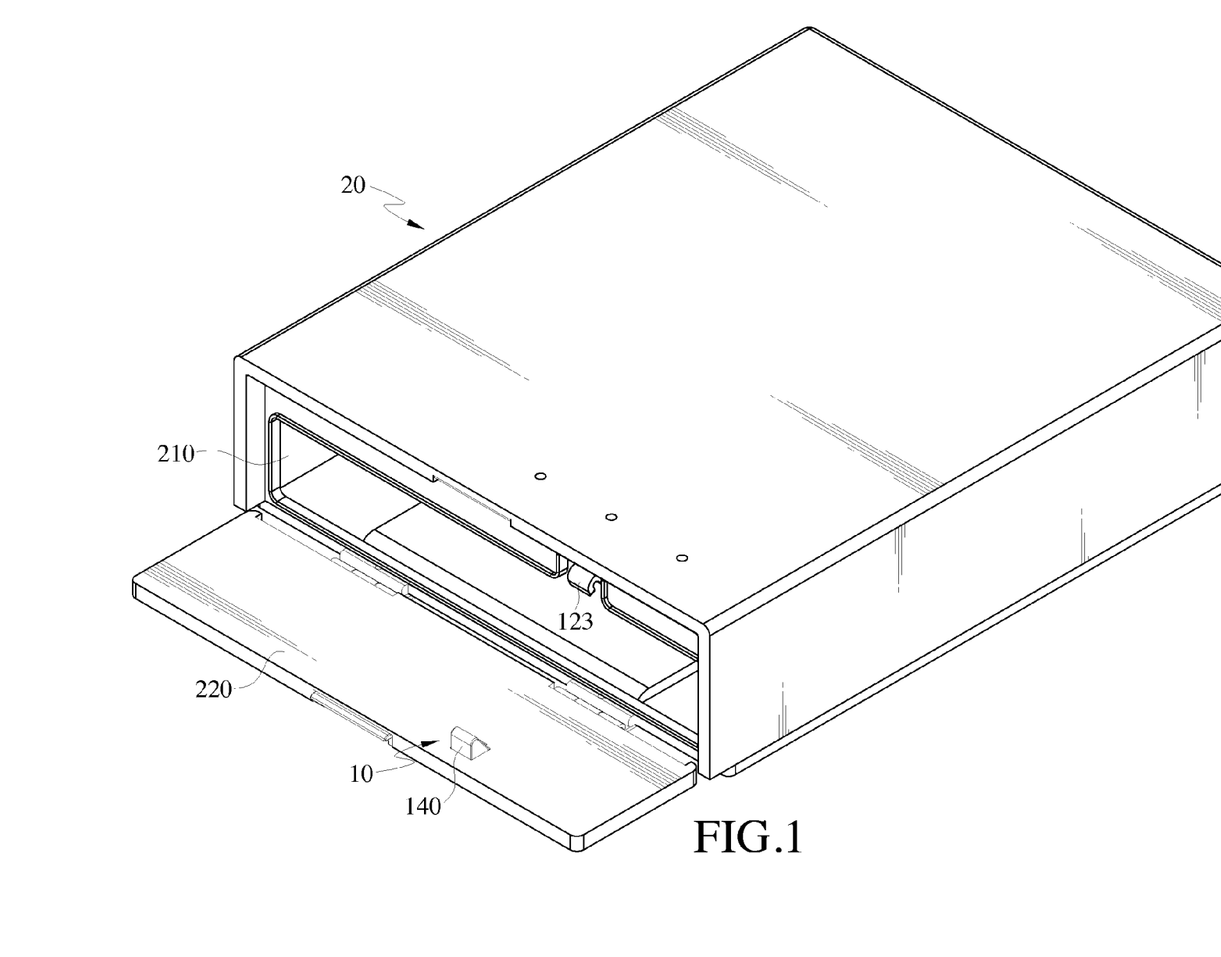
FIG. 1 is a schematic assembled view of a first embodiment of the present invention.
Figure 2:
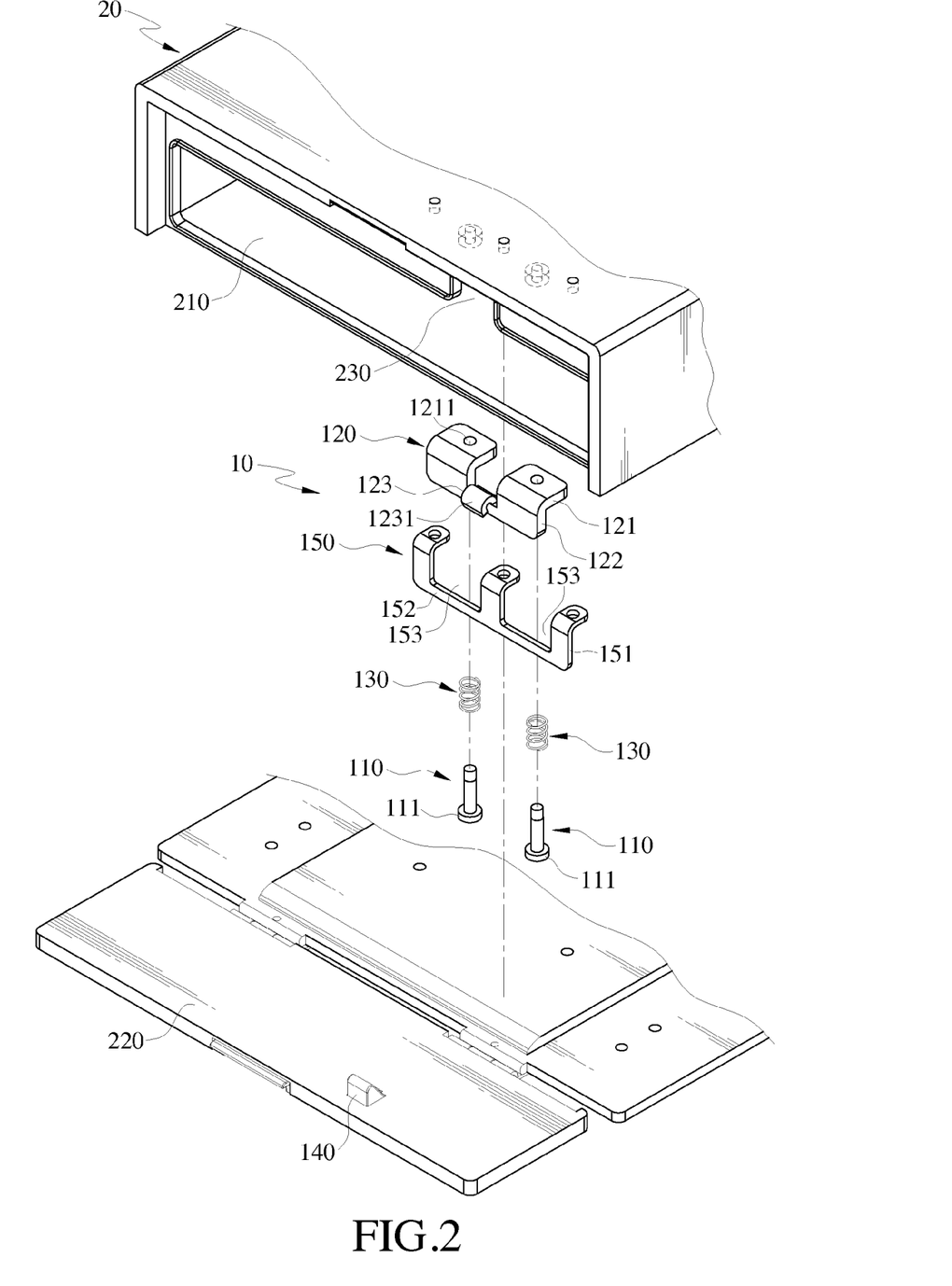
FIG. 2 is a schematic exploded view of the first embodiment of the present invention.

FIGS. 1 and 2 are schematic assembled and exploded views of a first embodiment of the present invention. A mounting assembly 10 of the first embodiment of the present invention is disposed in a case 20 having an opening 210 and a door panel 220. The opening 210 is disposed on one side surface of the case 20 and is in connection with an accommodation space in the case 20. The door panel 220 is pivoted to one side of the case 20 adjacent to the opening 210 and is capable of rotating relative to the case 20 so as to cover the opening 210 or uncover the opening 210. Furthermore, the side surface of the case 20 has a notch 230, and the notch 230 is disposed on one side edge of the opening 210 and is in connection with the opening 210.

Figure 3:
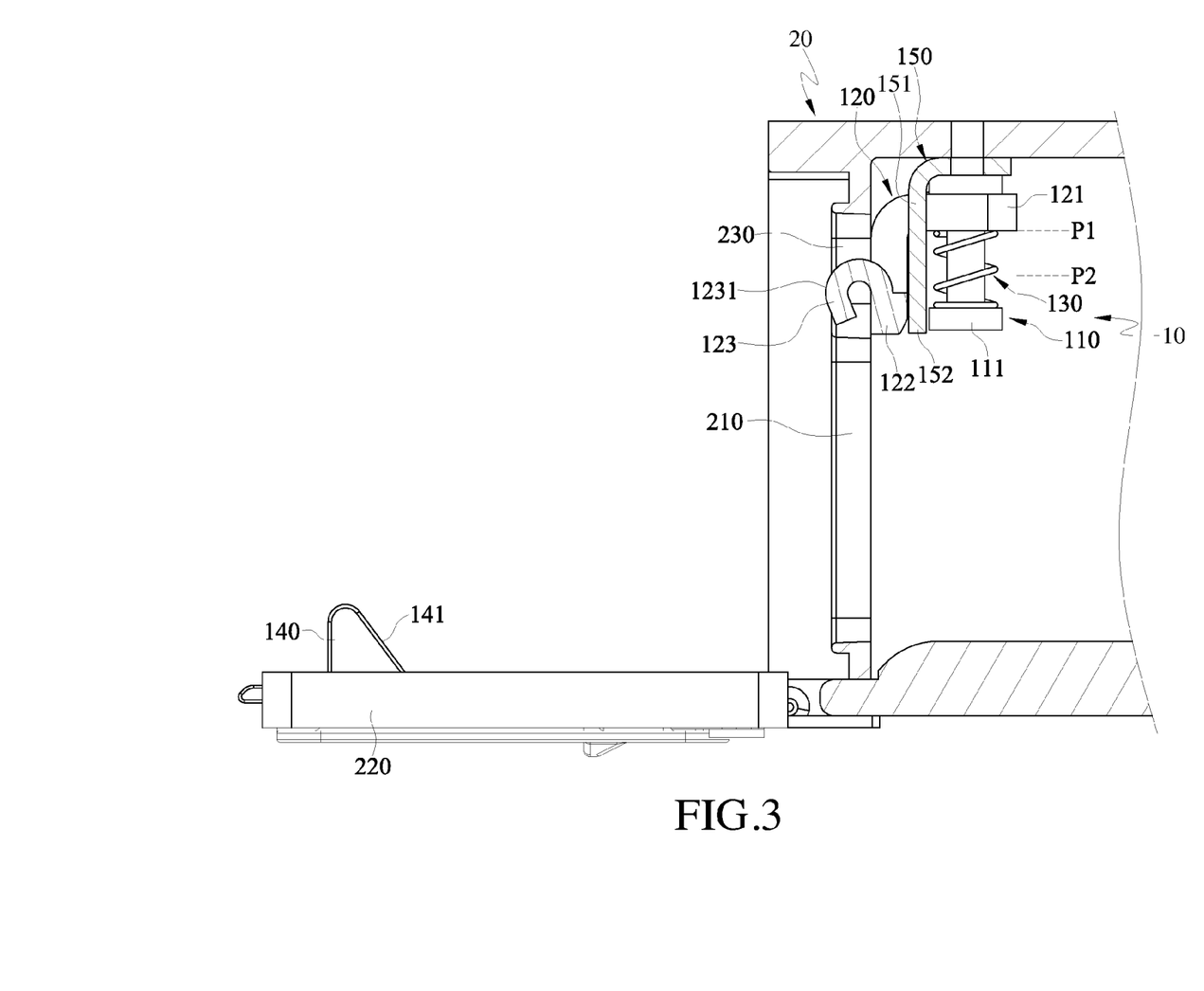
FIG. 3 is a schematic cross-sectional view of the first embodiment of the present invention.

Referring to FIGS. 1 to 3, the mounting assembly 10 comprises two fixing rods 110, a stopper member 120, two elastic members 130 and an actuator 140. The two fixing rods 110 are disposed at an interval on one inner side of the case 20 adjacent to the opening 210, and the two fixing rods 110 are respectively corresponding to two opposite side edges of the notch 230. One end of each of the two fixing rods 110 is connected to the case 20, and the other end has a stopping portion 111. The stopper member 120 has a bent section 121 and a vertical section 122. The bent section 121 is formed by extending from the vertical section 122, and is oblique to the vertical section 122. The bent section 121 has two perforations 1211, and a gap 1212 between the two perforations 1211. The stopper member 120 is sleeved on the two fixing rods 110 through the two perforations 1211 respectively, is movably disposed on the two fixing rods 110. Thus, the stopper member 120 is capable of reciprocating movement between a first position P1 and a second position P2 relative to the two fixing rods 110.

Wherein the vertical section 122 has an actuation portion 123, and the actuation portion 123 is located between the two perforations 1211, and corresponding to the notch 230 of the case 20. When the stopper member 120 is at the first position P1, the bent section 121 of the stopper member 120 is close to the case 20, and the vertical section 122 is embedded into one side edge of the opening 210. At this time, the actuation portion 123 of the vertical section 122 is accommodated in the notch 230. When the stopper member 120 is at the second position P2, the bent section 121 of the stopper member 120 is close to the stopping portions 111 of the two fixing rods 110, and the vertical section 122 shields the opening 210.

The two elastic members 130 are respectively sleeved on the two fixing rods 110 in the form of a compression spring, and one end of each of the two elastic members 130 urges against the stopping portion 111, and the other end presses against the bent section 121 of the stopper member 120, such that the stopper member 120 is normally maintained at the first position P1 and away from the opening 210. The actuator 140 is disposed on one side surface of the door panel 220 opposite to the opening 210, and the actuator 140 is corresponding to the actuation portion 123 of the stopper member 120. The actuator 140 has an oblique plane 141, and when the door panel 220 rotates relative to the case 20 to cover the opening 210, the oblique plane 141 of the actuator 140 presses a guiding surface 1231 of the actuation portion 123, such that the stopper member 120 is pushed by the actuator 140 to move from the first position P1 to the second position P2, and thus is temporarily limited at the second position P2.

Furthermore, in order to improve the stability of the stopper member 120 when moving between the first position P1 and the second position P2, a supporting member 150 is selectively disposed between the vertical section 122 of the stopper member 120 and the fixing rod 110. The supporting member 150 has a plurality of retaining sections 151 and a limiting section 152. One end of each of the retaining sections 151 is secured to the case 20 through a fastening member such as a screw or bolt (not shown), and the other end is connected to the limiting section 152. In addition, a via 153 is formed between two neighboring retaining sections 151. The bent section 121 of the stopper member 120 passes through the via 153, and is sleeved on one of the retaining sections 151 through the gap 1212 and transversally disposed above the limiting section 152. When the oblique plane 141 of the actuator 140 presses the guiding surface 1231 of the actuation portion 123, the vertical section 122 urges against and slips on the limiting section 152 under an action force of the actuator 140, thereby preventing the stopper member 120 from vibrating on the fixing rod 110 to interfere the movement of the bent section 121 on the fixing rod 110.

Figure 4:
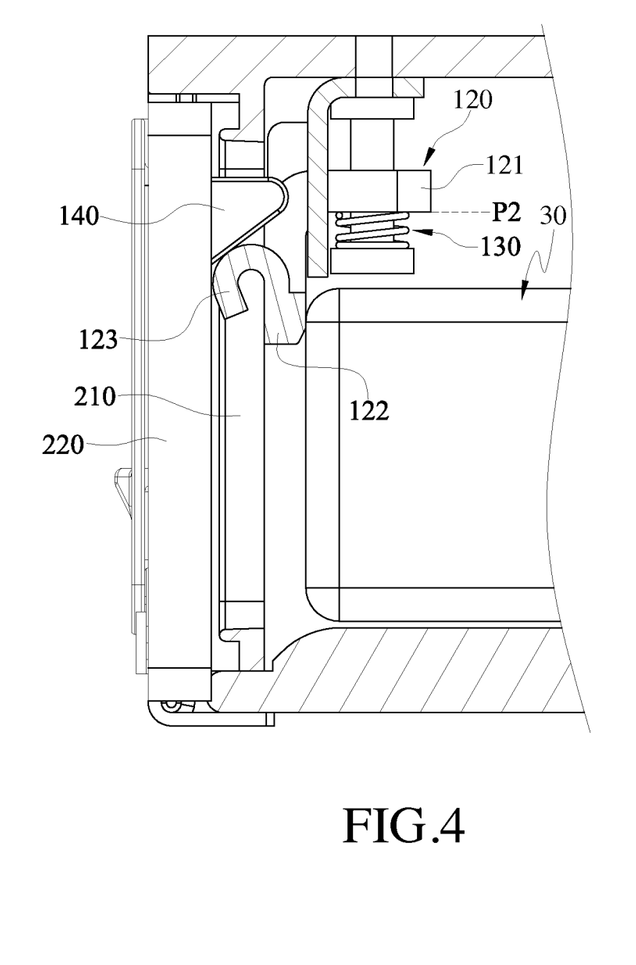
FIG. 4 is a schematic cross-sectional view of a door panel covering an opening according to the first embodiment of the present invention.
Figure 5:
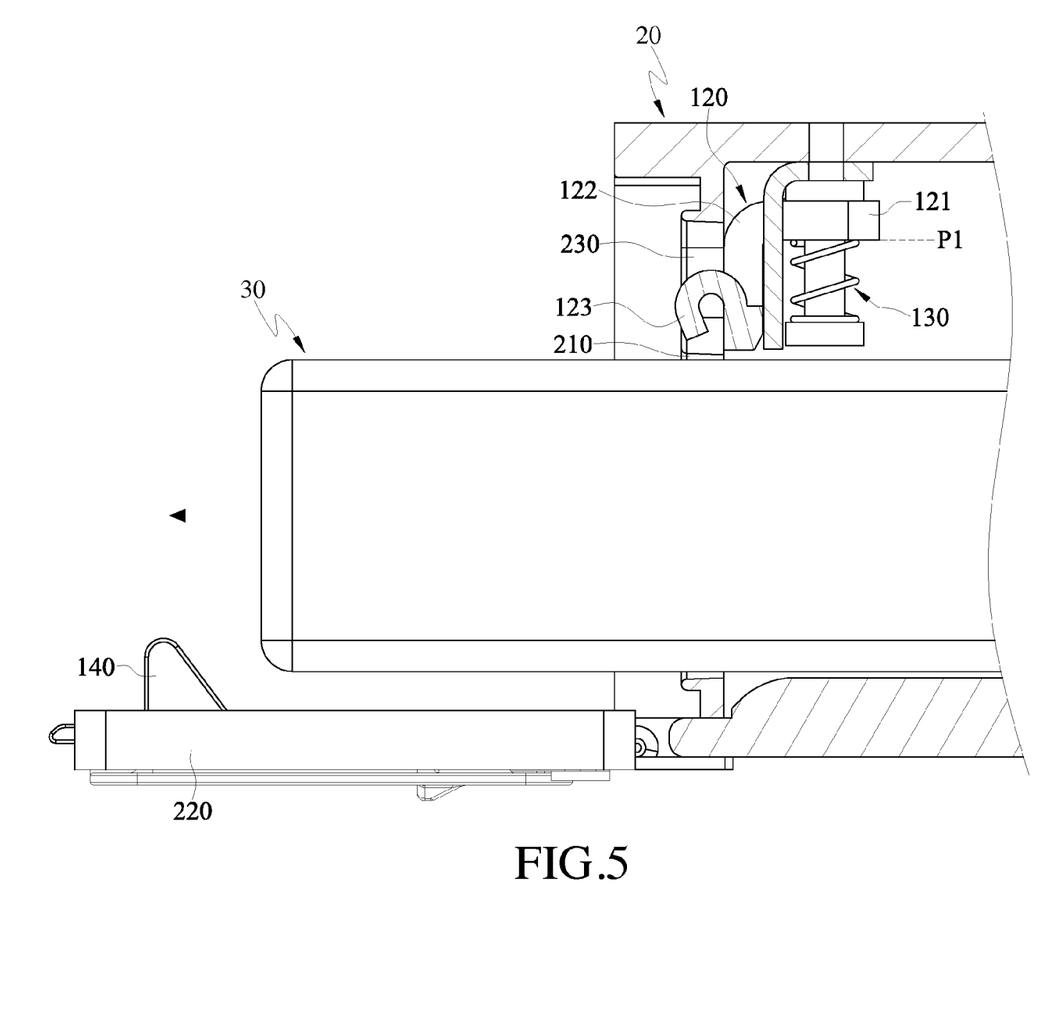
FIG. 5 is a schematic cross-sectional view of the door panel in an open state according to the first embodiment of the present invention.

Referring to FIGS. 3 to 5, in the application of the mounting assembly 10 of the first embodiment of the present invention, when the door panel 220 of the case 20 is in an open state, the stopper member 120 is pressed by the elastic member 130 and thus normally located at the first position P1, such that the user can accommodate an object 30 (e.g., battery) in the case 20 through the opening 210 without obstruction (not shown in FIG. 3). When the object 30 is accommodated in the accommodation space of the case 20, the user can rotate the door panel 220 to cover the opening 210 and close the opening 210. At this time, the actuator 140 located on the door panel 220 presses the actuation portion 123 of the stopper member 120 to drive the bent section 121 to compress the elastic member 130 and slip to the second position P2, such that the vertical section 122 shields the opening 210, urges against one side edge of the object 30, and separates the object 30 and the opening 210 (as shown in FIG. 4).

Therefore, when the case 20 is subjected to external impact, the object 30 is limited in the case 20 and stopped by the stopper member 120, and thus stably accommodated in the case 20. Thus, the object 30 is prevented from becoming loose under the external impact and move away from the case 20 through the opening 210, thereby preventing the object 30 from impacting the door panel 220 to damage the structure of the case 20.

Then, when the user intends to remove the object 30 from the case 20 for purpose of replacing a different object, the user only needs to rotate the door panel 220 again to uncover the opening 210. At this time, the actuator 140 is detached from the actuation portion 123 of the stopper member 120 along with the rotation of the door panel 220, and the downward pressure exerted on the actuation portion 123 by the actuator 140 is released. Therefore, the bent section 121 of the stopper member 120 is pushed back to the first position P1 by the elastic restoring force of the elastic member 130, and drives the vertical section 122 to be embedded into one side edge of the opening 210. Therefore, the object 30 may be removed out of the case 20 through the opening 210 without obstruction (as shown in FIG. 5).

Figure 6:
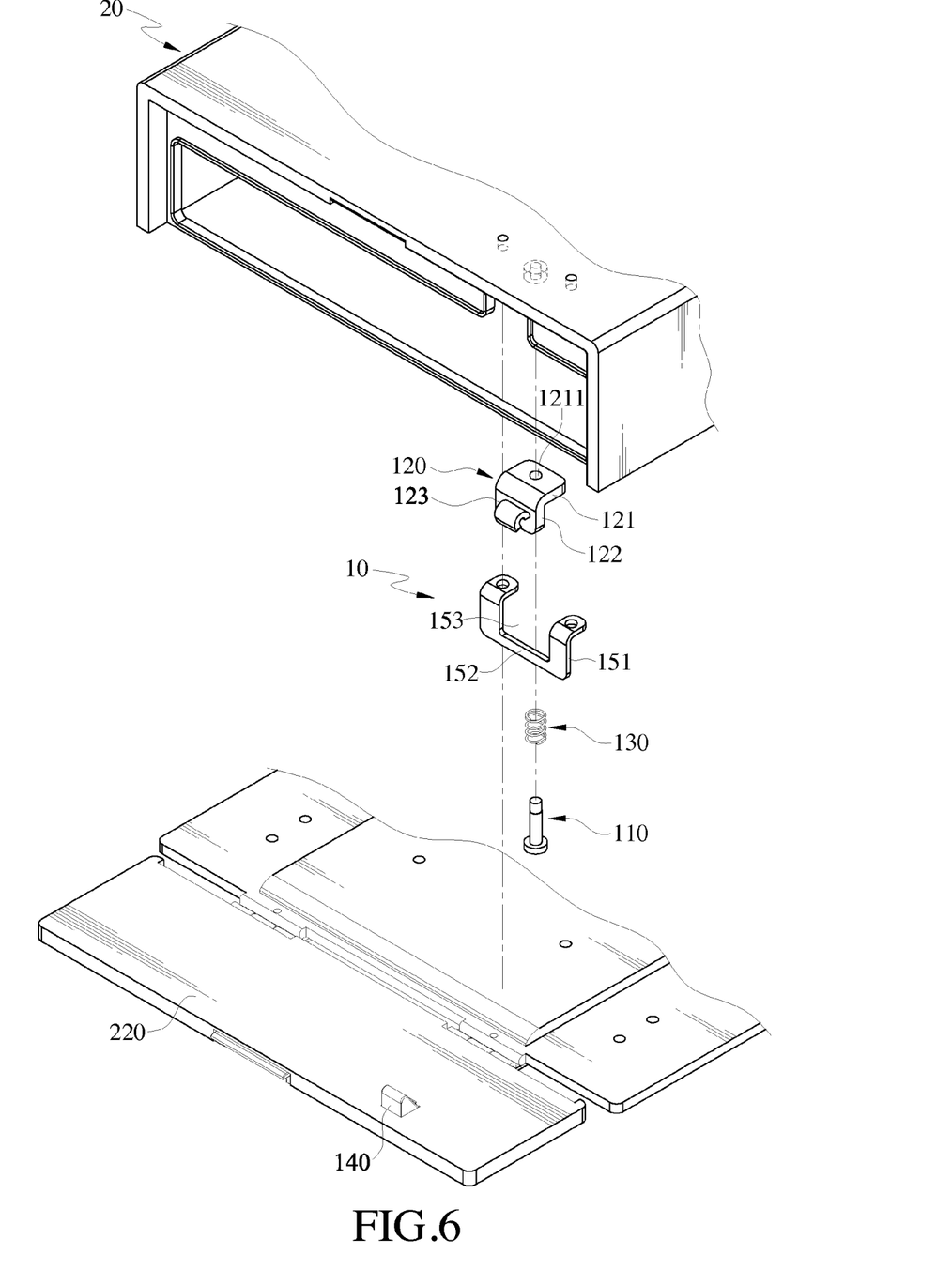
FIG. 6 is a schematic exploded view of a second embodiment of the present invention.

FIG. 6 is a schematic exploded view of a second embodiment of the present invention. The structures of the second embodiment and the first embodiment of the present invention are approximately the same, and only the difference is illustrated hereinafter.

In the mounting assembly 10 of the second embodiment of present invention, only one fixing rod 110 is disposed, and after the stopper member 120 and the elastic member 130 are sleeved on the fixing rod 110, the supporting member 150 is disposed on one inner side of the case 20 adjacent to the fixing rod 110. Two retaining sections 151 of the supporting member 150 are respectively located at two opposite side edges of the stopper member 120, and the bent section 121 of the stopper member 120 passes through the via 153 of the supporting member 150 and is transversally disposed above the limiting section 152. Therefore, the stopper member 120 can only move along an axial direction of the fixing rod 110 between the two retaining sections 151, and meanwhile the rotation of the stopper member 120 about a radial direction of the fixing rod 110 is limited.

Figure 7:
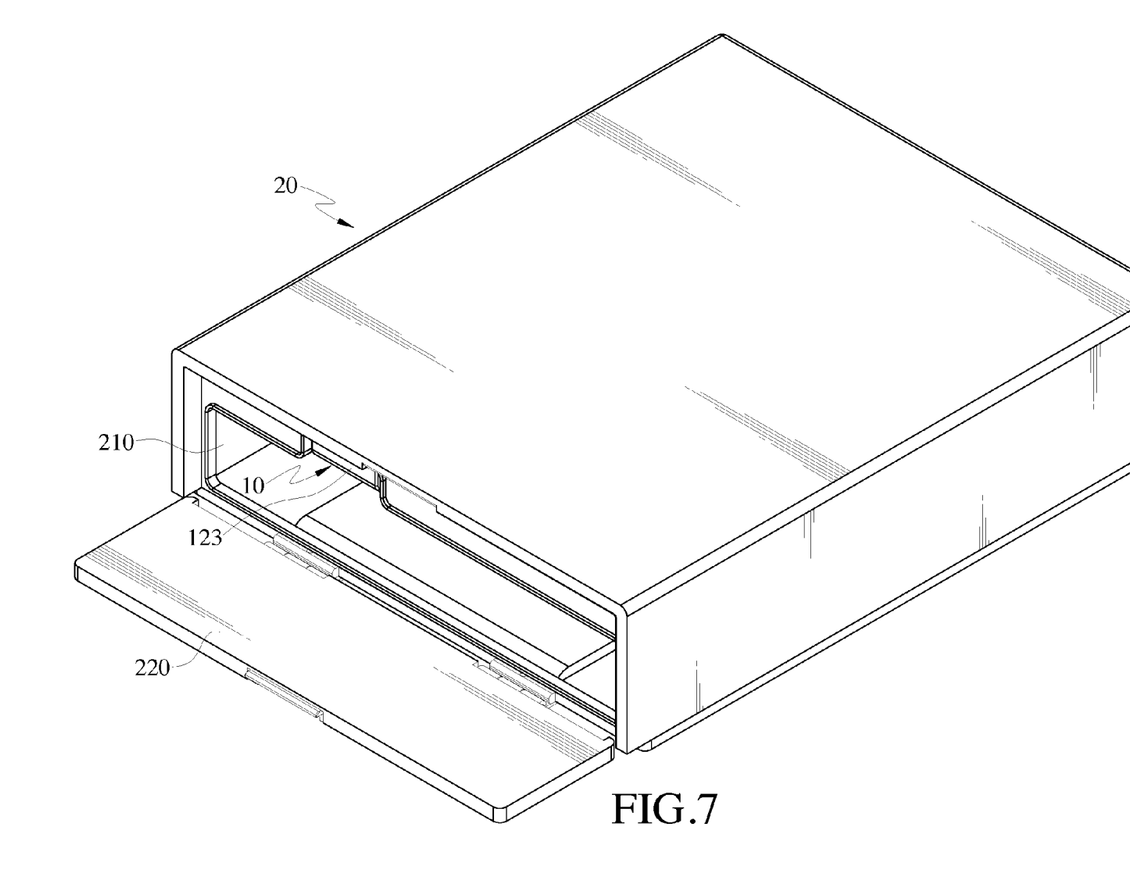
FIG. 7 is a schematic assembled view of a third embodiment of the present invention.
Figure 8:
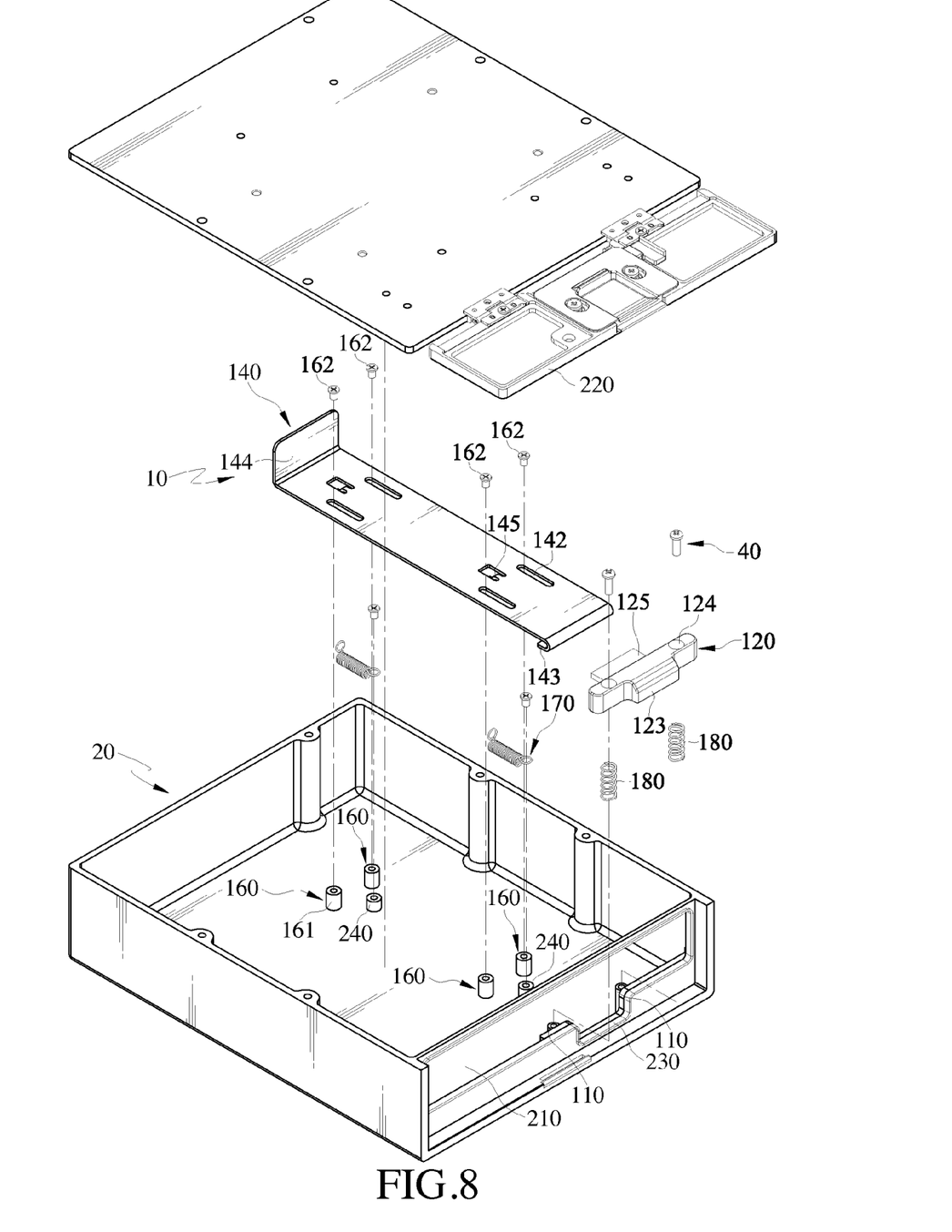
FIG. 8 is a schematic exploded view of the third embodiment of the present invention.

FIGS. 7 and 8 are schematic assembled and exploded views of a third embodiment of the present invention. A mounting assembly 10 of the third embodiment of the present invention is disposed in a case 20 having an opening 210 and a door panel 220. The opening 210 is disposed on one side of the case 20 and is in connection with the accommodation space in the case 20. The door panel 220 is pivoted to one side of the case 20 adjacent to the opening, and is capable of rotating relative to the case 20 so as to cover the opening 210 or uncover the opening 210. Furthermore, the side surface of the case 20 has a notch 230, and the notch 230 is disposed on one side edge of the opening 210 and is in connection with the opening 210.

Figure 9:
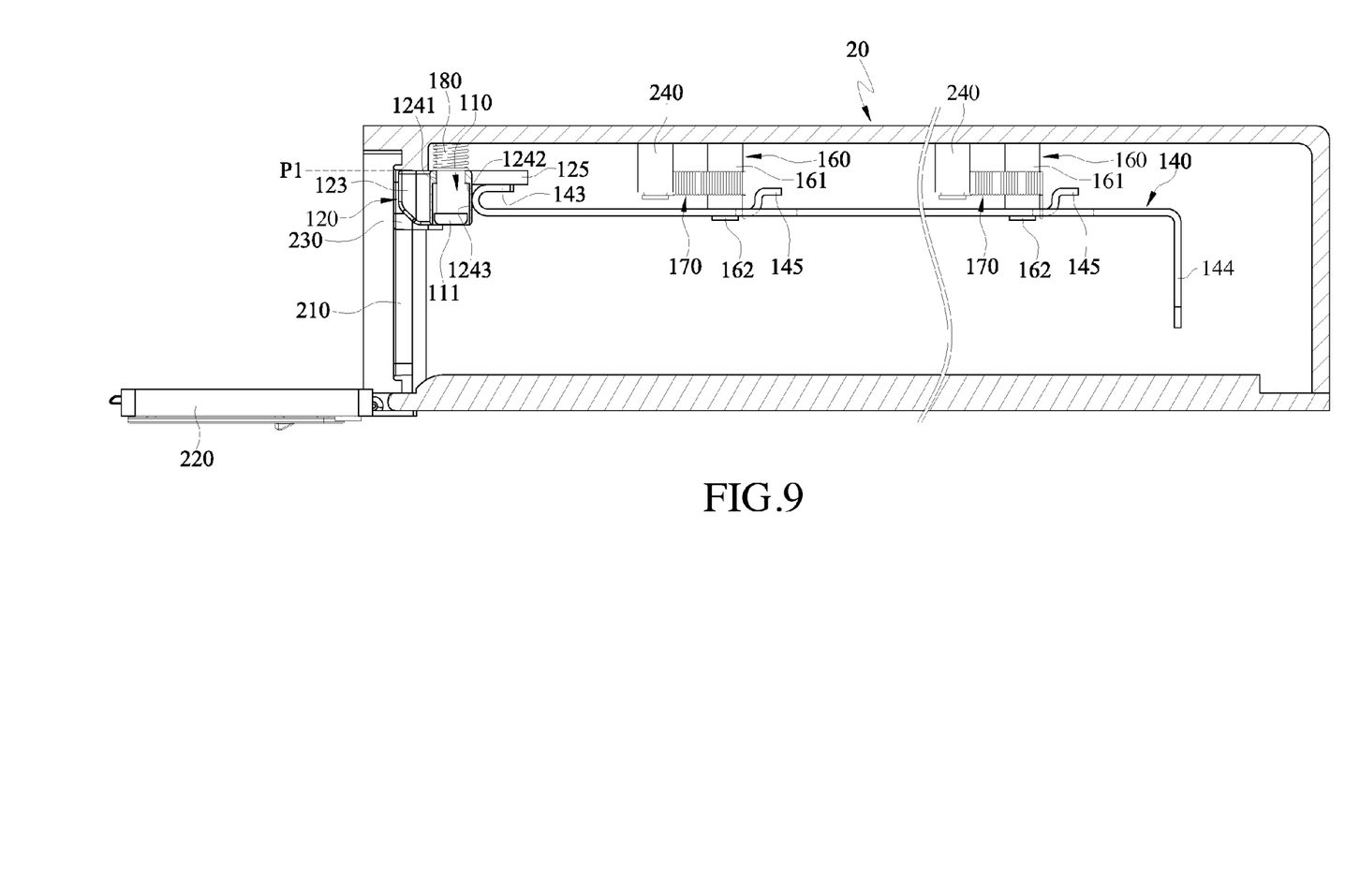
FIG. 9 is a schematic cross-sectional view of the third embodiment of the present invention.

Referring to FIGS. 7 to 9, the mounting assembly 10 comprises at least one fixing rod 110, a stopper member 120, at least one limiting rod 160, an actuator 140 and at least one first elastic member 170. The fixing rod 110 is disposed on the inner side of the case 20 adjacent to the opening 210, and a second elastic member 180 in the form of a compression spring is sleeved on the fixing rod 110. In addition, a fastening member 40 (such as a screw or bolt) is secured on one end of the fixing rod 110 away from the inner side of the case 20, and the diameter of a head portion of the fastening member 40 is greater than the diameter of the fixing rod 110, such that the head portion of the fastening member 40 forms a stopping portion 111 on the fixing rod 110, so as to prevent the second elastic member 180 detaching from the fixing rod 110.

Figure 11:
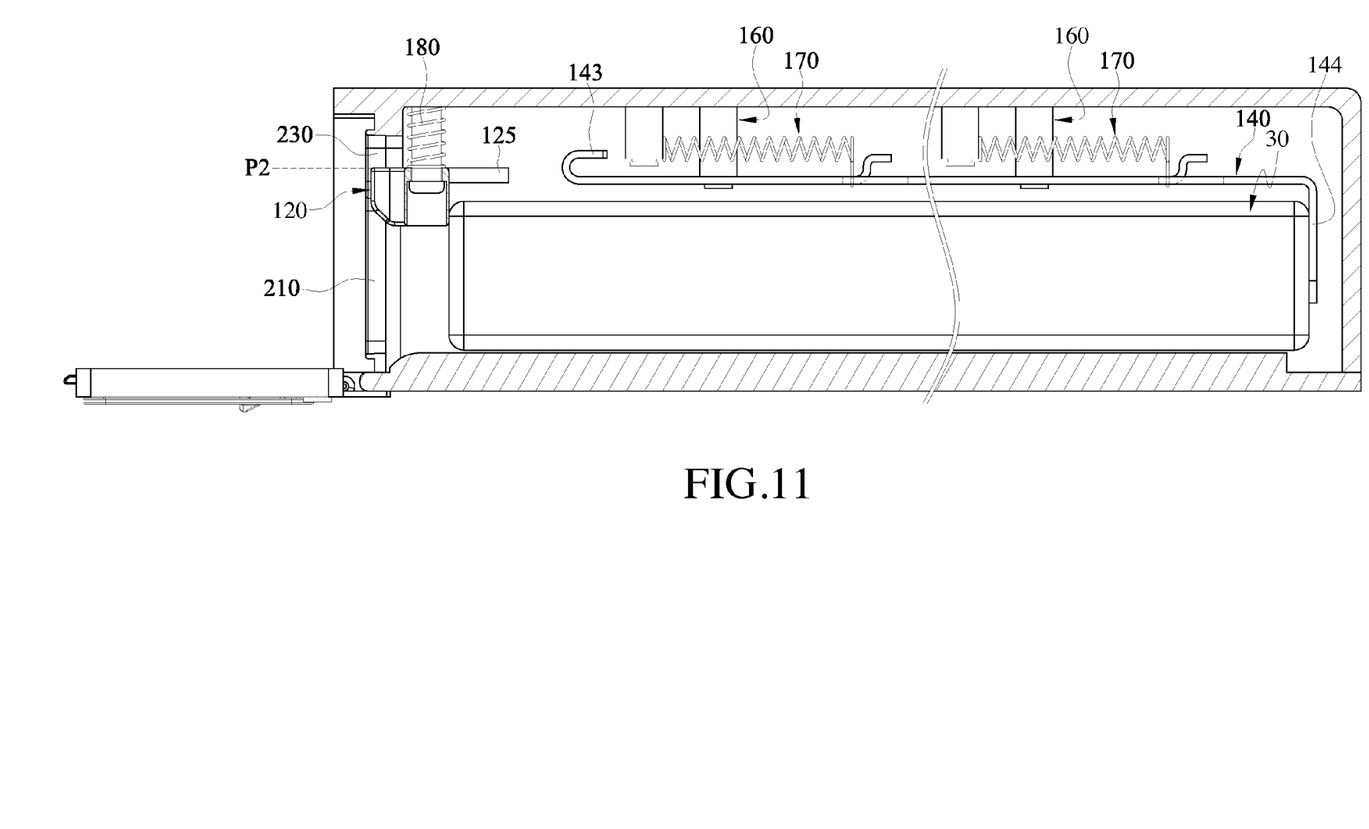
FIG. 11 is a schematic view illustrating operation of the third embodiment of the present invention.

The stopper member 120 has at least one through hole 124, is sleeved on the fixing rod 110 via the through hole 124, and is capable of reciprocating movement on the fixing rod 110 between a first position P1 and a second position P2 (as shown in FIGS. 9 and 11). One end of the second elastic member 180 urges against the case 20, and the other end pushes the stopper member 120, such that stopper member 120 is normally maintained at the second position P2. In addition, when the stopper member 120 is at the first position P1, the stopper member 120 is close to the case 20 and away from the opening 210, and is embedded into one side edge of the opening 210. When the stopper member 120 is at the second position P2, the stopper member 120 is close to the stopping portion 111 and shields the opening 210.

Furthermore, in this embodiment, a plurality of fixing rods 110 is disposed at an interval on the inner side of the case 20, and a plurality of through holes 124 having the same number as the fixing rods 110 is disposed on the stopper member 120, such that the stopper member 120 is sleeved on the fixing rods 110 through the through holes 124, thereby stably disposing the stopper member 120 on the fixing rod 110, and improving the stability of the stopper member 120 during reciprocating movement on the fixing rod 110. The stopper member 120 has a convergent section 1241, an urging surface 1242 and an expansion section 1243 which are located in the through hole 124. The urging surface 1242 is surrounded between the convergent section 1241 and the expansion section 1243, and an inner diameter of the convergent section 1241 is smaller than an outer diameter of the stopping portion 111, and an inner diameter of the expansion section 1243 is at least equal to the outer diameter of the stopping portion 111. Therefore, when the stopper member 120 is sleeved on the fixing rod 110 via the through hole 124, the stopping portion 111 of the fixing rod 110 is accommodated in the expansion section 1243, and when the stopper member 120 is at the second position P2, the urging surface 1242 of the stopper member 120 contacts the stopping portion 111, so as to prevent the stopper member 120 detaching from the fixing rod 110.

Furthermore, two opposite side surfaces of the stopper member 120 respectively have an actuation portion 123 and an extension portion 125. The actuation portion 123 is disposed on one side surface of the stopper member 120 opposite to the opening 210, and the extension portion 125 is disposed on the other side surface of the stopper member 120 away from the opening 210. In addition, when the stopper member 120 is at the first position P1, the actuation portion 123 is accommodated in the notch 230 of the case 20.

Referring to FIGS. 7 to 9, the limiting rod 160 is disposed on the case 20 and is distributed on one side of the fixing rod 110 away from the opening 210. Likewise, in this embodiment, a plurality of limiting rods 160 is disposed on the inner side of the case 20, such that after the actuator 140 is movably disposed on the limiting rods 160, the stability of the actuator 140 when moving in the case 20 is improved. Each limiting rod 160 has a rod body 161 and a combining member 162, and a plurality of grooves 142 having the same number as the limiting rods 160 is disposed on the actuator 140. The grooves 142 are opened in a direction parallel to the central axis of the opening 210. The actuator 140 is sleeved on the limiting rods 160 through the grooves 142, in which one side surface of the actuator 140 opposite to the case 20 contacts the rod bodies 161, and one end of each of the combining members 162 passes through the groove 142, and the other end urges against the other side surface of the actuator 140 away from the case 20, such that the actuator 140 is limited between the rod bodies 161 and the combining members 162, and is capable of reciprocating movement between an initial position P3 and a release position P4 relative to the limiting rods 160 along the grooves 142 (as shown in FIGS. 10 and 11).

The actuator 140 has a first end 143 and a second end 144 opposite to each other. The second end 144 is bent on the actuator 140, and is oblique to the first end 143 on the actuator 140. The grooves 142 are disposed between the first end 143 and the second end 144, and at least one buckling portion 145 is further disposed between the first end 143 and the second end 144. The buckling portion 145 protrudes from one side surface of the actuator 140 opposite to the case 20, and forms a hook structure on the actuator 140. The first elastic member 170 is disposed on the case 20 in the form of an extension spring. One end of the first elastic member 170 is hooked to the buckling portion 145 of the actuator 140, and the other end is connected to a protruding cylinder 240 of the case 20, such that the actuator 140 is pulled by the first elastic member 170 and normally maintained at the initial position P3.

Figure 10:
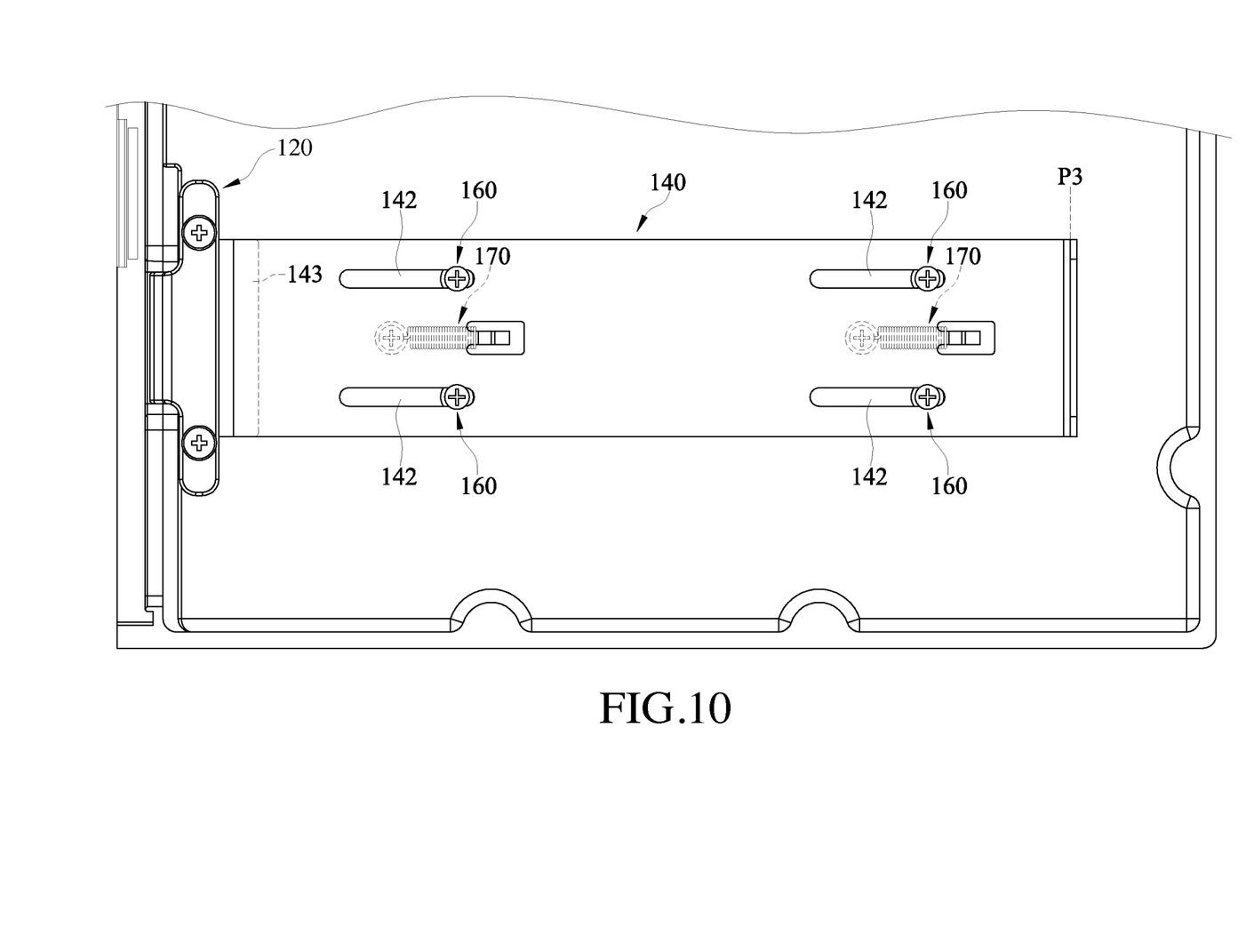
FIG. 10 is a schematic bottom view of an actuator at an initial position according to the third embodiment of the present invention.

Referring to FIGS. 9 and 10, when the mounting assembly 10 is in an initial state, the actuator 140 is pulled by the first elastic member 170 and maintained at the initial position P3, and the first end 143 of the actuator 140 stops from below the extension portion 125 of the stopper member 120, such that the stopper member 120 compresses the second elastic member 180, and under the elastic restoring force of the second elastic member 180, the extension portion 125 urges against the first end 143 of the actuator 140, thereby maintaining the stopper member 120 at the first position P1. At this time, since the stopper member 120 is embedded into one side edge of the opening 210, the opening 210 is uncovered, and the user can accommodate the object (not shown) in the case 20 or remove the object (not shown) out of the case 20 through the opening 210.

Referring to FIGS. 9 to 12 at the same time, when the user accommodates the object 30 in the case 20 through the opening 210, the object 30 pushes the second end 144 of the actuator 140, and extends the first elastic member 170. Thus, the actuator 140 slips from the initial position P3 to the release position P4 relative to the limiting rods 160 along the grooves 142, such that the first end 143 of the actuator 140 is detached from the extension portion 125 of the stopper member 120. At this time, the stopper member 120 is under the elastic restoring force of the second elastic member 180 and slips from the first position P1 to the second position P2 to shield the opening 210. At the same time, the stopper member 120 separates the object 30 and the opening 210, and one side surface of the stopper member 120 away from the opening 210 urges against the object 30. Therefore, the object 30 is clamped by the stopper member 120 and the actuator 140 and thus stably accommodated in the case 20.

Figure 12:
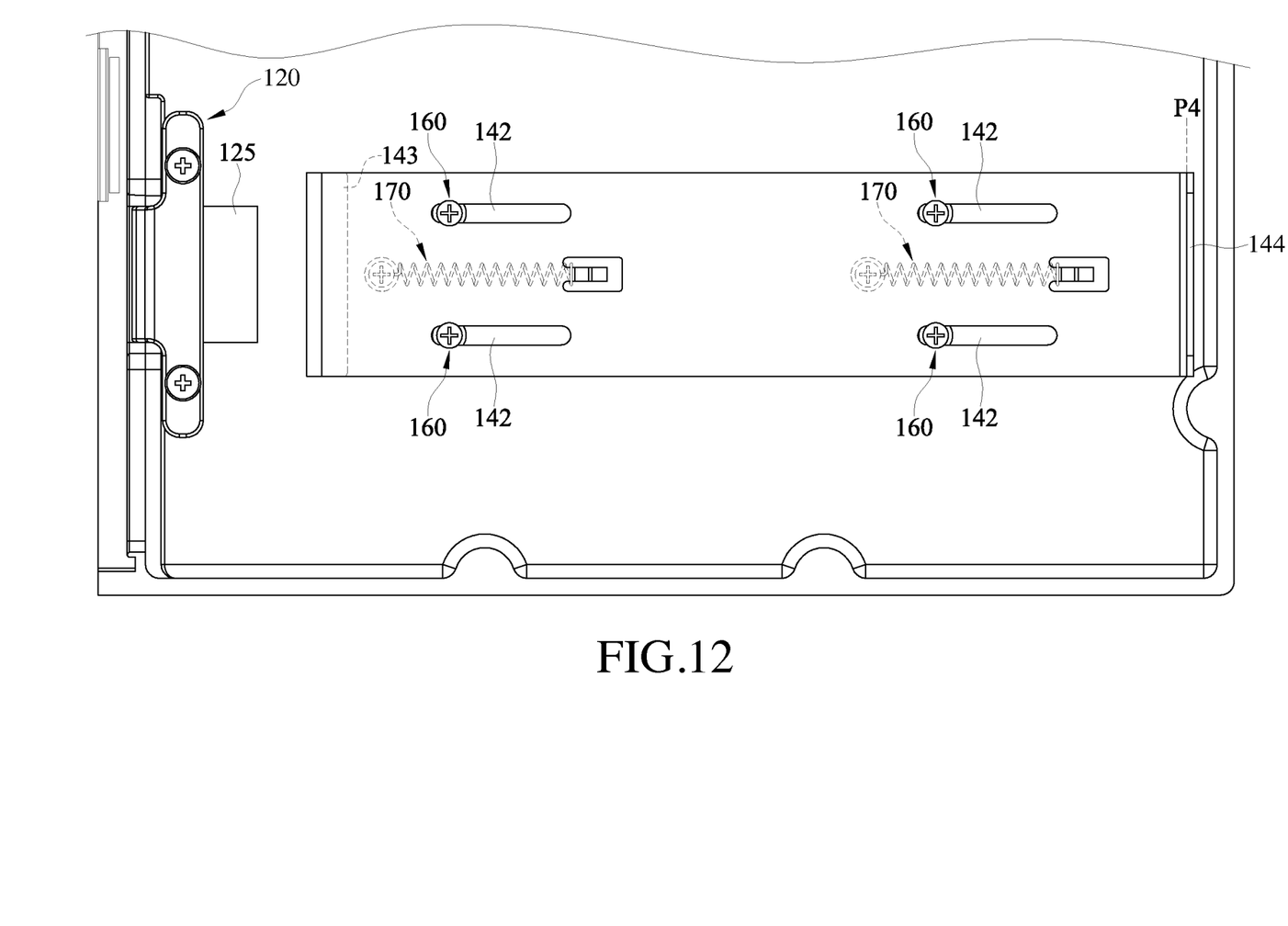
FIG. 12 is a schematic bottom view of the actuator at a release position according to the third embodiment of the present invention.

Based on the above structure, when the case 20 is subjected to external impact, since the object 30 is clamped by the stopper member 120 and the actuator 140 and secured in the case 20, the object 30 is prevented from becoming loose due to vibration. At the same time, since the stopper member 120 separates the object 30 and the opening 210, the object 30 is prevented moving away from the case 20 through the opening 210, thereby preventing the object 30 from impacting the door panel 220 to cause damage of the case 20 and the object 30.

The efficacy of the present invention lies in that, due to the interaction of the actuator and the stopper member, after the user disposes the object in the case, the actuator directly drives the stopper member to shield the opening of the case and separate the opening and the object, such that the object is stopped by the stopper member and thus limited in the case.

Therefore, when the case is subjected to external impact, the object is prevented moving away from the case to cause damage of the door panel and the object. In addition, during the operation of the actuator and the stopper member, the user can simply complete the operation procedures of fixing the object in the case by opening the door panel, accommodating the object in the case and covering the door panel on the opening. Therefore, the operating procedures are simplified, which provides the convenience in operation for the user.

What is claimed is:

1. A mounting assembly, configured in a case having an opening and a door panel, wherein the door panel is pivoted to the case and is capable of rotating relative to the case so as to cover the opening or uncover the opening, the mounting assembly comprising:

at least one fixing rod, disposed on one inner side of the case adjacent to the opening;

a stopper member, movably disposed on the fixing rod and capable of reciprocating movement between a first position and a second position, wherein when the stopper member is at the first position, the stopper member is away from the opening, and when the stopper member is at the second position, the stopper member shields the opening;

at least one limiting rod, disposed on the inner side of the case and spaced apart from the fixing rod and the opening;

an actuator, having at least one groove, wherein the actuator is sleeved on the limiting rod through the groove and is capable of reciprocating movement between an initial position and a release position relative to the limiting rod, and when the actuator is at the initial position, the stopper member urges against the actuator and is maintained at the first position, and when the actuator is at the release position, the actuator is detached from the stopper member, such that the stopper member slips to the second position; and at least one first elastic member, disposed on the case, wherein one end of the first elastic member is connected to the inner side of the case, and the other end of the first elastic member is connected to the actuator, such that the actuator is normally maintained at the initial position.

2. The mounting assembly according to claim 1, wherein one side of the stopper member opposite to the actuator has an extension portion, and when the stopper member is at the first position, the extension portion urges against the actuator.

3. The mounting assembly according to claim 2, wherein the actuator comprises a first end and a second end, the second end is oblique to the first end, and when the actuator is at the initial position, the extension portion of the stopper member urges against the first end, and when an object is accommodated in the case, the object pushes the second end, such that the actuator moves to the release position and the first end is detached from the extension portion.

4. The mounting assembly according to claim 1, comprising at least one second elastic member, wherein the second elastic member is sleeved on the fixing rod, and one end of the second elastic member pushes the stopper member, such that the stopper member is maintained at the second position.

5. The mounting assembly according to claim 1, wherein the actuator has a buckling portion, and the end of the first elastic member connected to the actuator is hooked to the buckling portion.

6. The mounting assembly according to claim 1, wherein the fixing rod has a stopping portion, and when the stopper member is at the second position, the stopper member contacts against the stopping portion.

7. The mounting assembly according to claim 6, wherein the stopper member has a through hole and an urging surface, the urging surface is surrounded in the through hole, the stopper member is sleeved on the fixing rod via the through hole, and when the stopper member is at the second position, the urging surface contacts against the stopping portion.

8. The mounting assembly according to claim 7, wherein the stopper member has a convergent section and a expansion section, the convergent section and the expansion section are located in the through hole, wherein the urging surface is between the convergent section and the expansion section, an inner diameter of the convergent section is smaller than an outer diameter of the stopping portion, an inner diameter of the expansion section is at least equal to the outer diameter of the stopping portion, the stopper member is sleeved on the fixing rod, and the stopping portion is accommodated in the expansion section.

9. The mounting assembly according to claim 1, wherein one side of the case adjacent to the opening has a notch, the notch is in connection with the opening, one side of the stopper member opposite to the opening has an actuation portion corresponding to the notch, and when the stopper member is at the first position, the actuation portion is accommodated in the notch.

* * * * *